United States Patent
Sander

(10) Patent No.: US 7,626,151 B2
(45) Date of Patent: Dec. 1, 2009

(54) AUTOFOCUS SYSTEM AND METHOD FOR AUTOFOCUSING AN OPTICAL IMAGING INSTRUMENT

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 11/747,272

(22) Filed: May 11, 2007

(65) Prior Publication Data

US 2007/0262232 A1    Nov. 15, 2007

(30) Foreign Application Priority Data

May 15, 2006  (DE)  ......................... 10 2006 022 591
Aug. 30, 2006 (DE)  ......................... 10 2006 040 636

(51) Int. Cl.
   *G02B 7/04*      (2006.01)
(52) U.S. Cl. .................................. 250/201.3; 250/201.4
(58) Field of Classification Search ............. 250/201.3, 250/201.2, 201.4–201.8
See application file for complete search history.

(56) References Cited

U.S. PATENT DOCUMENTS

| | | | |
|---|---|---|---|
| 5,288,987 A | | 2/1994 | Vry et al. |
| 5,604,344 A | * | 2/1997 | Finarov .................... 250/201.3 |
| 5,925,874 A | | 7/1999 | Liegel et al. |
| 6,075,558 A | * | 6/2000 | Tachibana et al. ............. 348/80 |
| 6,115,111 A | * | 9/2000 | Korah et al. ................ 356/4.01 |
| 6,399,935 B1 | | 6/2002 | Jovin et al. |
| 2002/0186464 A1 | | 12/2002 | Schmalz |
| 2005/0057812 A1 | * | 3/2005 | Raber .......................... 359/619 |
| 2006/0018651 A1 | * | 1/2006 | Cho et al. .................... 396/111 |
| 2006/0171263 A1 | * | 8/2006 | Cho et al. ................. 369/44.23 |
| 2006/0203358 A1 | * | 9/2006 | Cho et al. .................... 359/726 |
| 2007/0014001 A1 | * | 1/2007 | Ujike et al. .................. 359/368 |

FOREIGN PATENT DOCUMENTS

DE    19811202 A1    9/1999
WO    2006/021205 A1    3/2006

* cited by examiner

*Primary Examiner*—Thanh X Luu
*Assistant Examiner*—Kevin Wyatt
(74) *Attorney, Agent, or Firm*—Hodgson Russ LLP

(57) ABSTRACT

The invention relates to an autofocus system for an optical instrument (1) that images a specimen (11), having an irradiation optical system (7) for generating an irradiation beam path that generates an autofocus pattern on the specimen (11), the irradiation beam path being directed onto the specimen by means of a deflection element (10), and having an autofocus analysis unit (19) to which is conveyed, by means of a deflection element (15), a detector beam path that encompasses radiation, reflected from the specimen (11), of the irradiation beam path, a micromirror array (20) having individually controllable and adjustable micromirrors being provided in combined fashion as a deflection element (10) for the irradiation beam path and as a deflection element (15) for the detector beam path.

15 Claims, 7 Drawing Sheets

AUTOFOCUS SYSTEM AND METHOD FOR AUTOFOCUSING AN OPTICAL IMAGING INSTRUMENT

CROSS REFERENCE TO RELATED APPLICATIONS

This application claims priority of German patent application no. 10 2006 022 591.0 filed May 15, 2006 and claims priority of German patent application no. 10 2006 040 636.2 filed Aug. 30, 2006, both of which are incorporated by reference herein.

FIELD OF THE INVENTION

The present invention relates to an autofocus system for an optical instrument that images a specimen. The invention further relates to a method for autofocusing using a corresponding autofocus system. Lastly, the invention relates to a computer program and a computer program product for implementing the aforesaid method.

BACKGROUND OF THE INVENTION

An autofocus arrangement is known from DE 41 31 737 C2 (corresponds to U.S. Pat. No. 5,288,987). It is used for a stereomicroscope having a main objective. With this autofocus system, a projection beam path is generated by a projection optical system, the projection optical system comprising a laser diode, a collimator lens, optionally an attenuator, and a cylindrical lens, arranged one behind another. With this, the image of a strip-shaped marking is generated in a focal plane, said image in turn being imaged onto the specimen surface by means of a further lens, a deflection element, and the main objective of the stereomicroscope. The projection beam path thus generates a strip pattern, constituting an autofocus pattern, on the specimen surface. By means of a further deflection element, a portion of the observation beam path that contains light of the projection beam path reflected from the specimen is coupled out and conveyed to a light-sensitive, spatially resolving position detector made up of multiple individual sensitive elements and constituting an autofocus analysis unit. Here the projection beam path corresponds to the irradiation beam path mentioned initially, and the coupled-out observation beam path corresponds to the detector beam path mentioned initially.

With this known autofocus system, defocusing results in a lateral shift of the image of the strip-shaped marking on the position detector; that shift is registered via the autofocus analysis unit and used as a control signal for a focus motor for refocusing. The principal criterion in the context of this known autofocus system is the fact that here the projection beam path to the specimen proceeds entirely outside the observation beam paths, and interfering reflections at the objective into the observation beam paths, caused by the projection beam paths, are largely precluded. For autofocusing, the intercept distance of the objective being used is adjusted in motorized fashion, or the entire stereomicroscope is moved along the optical axis in motorized fashion.

Another autofocus system is known from EP 1 241 506 A2 (corresponds to US 2002/0186464). Here a video camera that is present on a surgical microscope for documentation purposes is used to ascertain the correct focus position of the microscope. The camera comprises an image sensor and a signal processor unit, the latter ascertaining the optimum focusing, for example, using the contrast method. By means of an interface in the camera and a further interface in the microscope, the control signals generated in the camera are transferred, for focusing, into a control unit of the microscope; said unit applies control to corresponding actuating units in the microscope, which modify the objective focal length for autofocusing. Except for the aforesaid video camera, a separate measurement module is not used in this autofocus system.

SUMMARY OF THE INVENTION

Proceeding from this known existing art, the present invention takes as its object that of describing an autofocus system that enables reliable autofocusing with the least possible design outlay. A further intention is to describe a method for autofocusing that enables autofocusing in rapid and reliable fashion.

This object is achieved, according to the present invention, by an autofocus system, an optical instrument incorporating the autofocus system, and by a method for autofocusing according to the present invention. A computer program and a computer program product for implementing the method are also subject matter of the present invention. Advantageous embodiments are evident from the respective dependent claims and from the description that follows.

The invention proceeds from an autofocus system for an optical instrument that images a specimen, this system comprising an irradiation optical system for generating an irradiation beam path that generates an autofocus pattern on the specimen, the irradiation beam path being directed onto the specimen by means of a deflection element. The system furthermore comprises an autofocus analysis unit to which a detector beam path is conveyed by means of a deflection element, this detector beam path encompassing radiation, reflected from the specimen, of the irradiation beam path. By means of the autofocus analysis unit, the radiation, reflected from the specimen, of the autofocus pattern generated on the specimen surface can be analyzed in known fashion in terms of location, shape, and/or intensity, and a maximally sharp position can be derived therefrom. According to the present invention, a micromirror array having individually controllable and adjustable micromirrors is provided in this system in combined fashion as a deflection element for the irradiation beam path and as a deflection element for the detector beam path.

A micromirror array of this kind is generally made up of a two-dimensional arrangement having a plurality of micromirrors that can be electronically controlled as to their angular position, and thus displaced, either individually or in suitable combination. In this context, the base element receiving the micromirrors remains unmodified as to its position. The mirror orientation in the micro region can nevertheless be modified. This has the same effect as the tilting of a macromirror. In contrast to the tilting of a macromirror, the tilting of the micromirrors, with a stationary base element, requires much less space. The invention additionally results in the replacement of two deflection elements (one each for the irradiation beam path and the detector beam path) with a single micromirror array. The number of components required, and the space requirement of an autofocus system, are thus reduced.

Because a micromirror array is used, according to the present invention, as a deflection element for the irradiation beam path generating the autofocus pattern, this autofocus pattern can be modified in controlled fashion, in terms of its location and geometry and its light intensity, by corresponding application of control to the mirror array; the location, geometry, and intensity can moreover be caused to vary over time. The autofocus pattern can be, for example, spot-shaped, circular, slit-shaped, annular, linear, strip-shaped, or crescent-shaped. The use of a micromirror array thus offers numerous possibilities for generating suitable autofocus patterns.

The autofocus system according to the present invention furthermore has the significant advantage that it does not require a separate autofocus module with a special illumination system (laser), but instead, in the context of an optical instrument that uses an illumination optical system for illumination of the specimen, can utilize the existing illumination optical system to ascertain the focus position. This is because the irradiation beam path generating the autofocus pattern is constituted by at least a portion of the illumination beam path that is generated by the illumination optical system of the optical instrument. For this purpose, the micromirrors of the micromirror array must be adjustable in such a way that the autofocus pattern on the specimen can be generated from the illumination beam path. For this, a specific number of micromirrors on the micromirror array are switched and tilted so that the array acts as a geometric beam splitter. The beams forming the autofocus pattern can thus be generated by way of individually controllable micromirror regions. At the same time, the micromirror array serves to couple out the detector beam path; here again, micromirror regions are switched and tilted for this purpose in such a way that the radiation reflected from the specimen, from the region of the autofocus pattern on the specimen surface, is directed onto the autofocus analysis unit.

Additionally or alternatively to the generation of the autofocus pattern by means of suitably controlled regions of the micromirror array, a microdisplay with which the desired autofocus pattern is generated on the specimen can be introduced into the illumination beam path. The insertion of one or more microdisplays into the illumination beam path, preferably between the deflection element (micromirror array) and the light source, can once again allow the location, geometry, and/or intensity of the autofocus pattern to be defined and varied by corresponding application of control to the microdisplay. The embodiments already discussed in connection with generation of the autofocus pattern by way of the micromirror array, and the advantages presented there, apply analogously to the use of a microdisplay.

Microdisplays, like micromirror arrays, are known as such in the existing art. Details of the application of control to micromirror arrays or microdisplays will therefore not be explained individually in the present Patent Application. The reader is referred for that purpose to the literature of the existing art. Microdisplays are, for example, integrated into video glasses or display screen glasses, and are also used as displays for handheld computer devices such as mobile telephones, PDAs, etc. The term "microdisplay" is also intended to embrace microelectromechanical systems (MEMS) that are equipped with tiny mirrors and operate by front and back projection. Microdisplays can be further subdivided into transmissive and reflective displays; in the aforesaid technological applications, transmissive displays operate with background illumination. A transmissive display of this kind can consequently, in the context of the present invention, be "illuminated" or traversed by the illumination beam path. Image patterns that define or modify the autofocus pattern in a desired fashion can be generated on this display. A disadvantage of transmissive displays in this application is the often poor transmissivity, so that reflective displays can also be used. The illumination efficiency is substantially raised thereby. If a reflective display of this kind is inserted into the illumination beam path of an illumination optical system between a deflection mirror (micromirror array) and a light source or light guide, the beam path must be additionally folded because of reflection at the display.

A white-light or colored-light source, or an infrared-emitting light source such as a diode, can be provided as a light source of the irradiation optical system. The autofocus pattern can then be presented as a light/dark pattern in the case of a white-light source, or in color, for example, in the case of a multicolor LED light source. The patterns can, however, also be presented in the invisible spectral region (e.g. infrared). The type of presentation depends on whether the user wishes to use the autofocus pattern for detecting the "target focus location."

For analysis of the detector beam path, the autofocus analysis unit advantageously comprises a CCD array having individual analyzable elements. Such analysis units are known from the existing art and will therefore not be explained in detail in the context of the present invention.

The use according to the present invention of a micromirror array allows the latter to be utilized as a deflection element for the irradiation beam path and illumination beam path, and as a deflection element for the detector beam path. The corresponding regions of the micromirror array can be permanently set for this purpose (permanent tilt of the micromirrors in the respective regions), but a sequential (chronologically successive) setting is also possible, in which context the flicker limit must be kept in mind.

The autofocus system described here makes possible a method for autofocusing of an optical instrument such as the one indicated initially, a single micromirror array having individually controllable and adjustable micromirrors now being used for the deflection element of the irradiation beam path and for the deflection element of the detector beam path. Regarding the advantages of the method, reference may be made to the previously described advantages of the autofocus system according to the present invention.

The invention makes possible, in particular, an advantageous method for autofocusing in which two or more spot beams are generated by selected regions of the micromirror array, which beams generate a spot pattern on the specimen as an autofocus pattern, the spots of the spot pattern on the specimen being made to approach and finally to merge by angle adjustment of the micromirrors in the respective regions of the micromirror array. According to the triangulation principle, with a knowledge of the spacing of the regions on the micromirror array generating the spot beams, this angular position of the micromirrors or the angular position of the spot beams with respect to one another upon merging of the spots furnishes an indication of a specimen distance (e.g. from the micromirror array or from an objective of the optical instrument). With this method, the spot beams can advantageously once again be deflected or coupled out from the existing illumination beam path.

As long as two or more spots generated by the spot beams are visible on the specimen surface, the specimen surface is not located at the intersection point of the spot beams. For simplicity's sake, what will be considered below will be two spot beams generated by micromirror regions whose micromirrors lie in one plane or in mutually parallel planes. When the micromirrors of one region are tilted out of that plane (identical tilt angles of the micromirrors in one region), the corresponding spot beam can then, with a suitable tilt angle, be directed toward the other beam. In the same fashion, a suitable tilt angle for the other region can (additionally) be selected, so that the two spot beams are directed toward one another. Similar considerations apply to spot beams that are generated by spherical alignment of microscope mirrors from corresponding regions of the micromirror array, in which case the tilt angle must then be defined on the basis of the change in direction of the principal axis of the spot beam.

The tilt of the micromirrors in the regions of the array that generate the spot beams, and thus the angle enclosed by the spot beams, is then modified until the intersection point of the spot beams ends up on the specimen surface. At that moment the previously separate spots of the spot beams merge into a single (intersection) spot. From the tilt angles then respectively assumed by the micromirrors in the two regions generating the spot beams, and from the spacing of those two regions, it is then possible to determine by triangulation the distance from the regions to the specimen surface. Calculation methods in the context of triangulation are known and will therefore not be set forth explicitly hereinafter.

This method functions similarly even when the irradiation or illumination beam path is guided through the main objective of an optical instrument (such as a microscope), so that the spot beams also pass through the main objective. In this case the refraction of the spot beams by the main objective must also be taken into account in the triangulation calculation.

Corresponding specimen distances, and thus the necessary displacements for autofocusing, can thus be associated with specific tilt angles of the regions on the micromirror array. In the case of an optical instrument having an objective of fixed focal length (for example, a focal length of 20 cm) and a specific or calculated specimen distance from the objective (for example, 25 cm), the objective must be correspondingly displaced (in the example being considered, must be brought 5 cm closer to the specimen) in order to produce a sharp image. In optical instruments having an objective of variable focal length (variable objective), it is possible to adapt the focal length correspondingly (to 25 cm, in the example being considered). The aforesaid adjustment possibilities (displacement of the objective or of the entire optical instrument and adjustment of a variable focal length) can of course also be combined with one another, for example for the case in which the distance between specimen and objective that is ascertained lies outside the focal-length range of the variable objective.

The invention additionally makes possible a detection of the direction of the focusing that must be performed (i.e., for example, the direction in which the main objective must be shifted). If the two spots generated on the specimen surface move toward one another as the tilt of the micromirrors is made increasingly large, the specimen is then located above the intersection point of the spot beams, and the main objective must be shifted away from the specimen surface. If the spots move away from one another as the tilt angle increases, the specimen is then located below the intersection point of the spot beams and the main objective must be displaced toward the specimen. The direction in which the main objective must be shifted can thus already be determined during the autofocusing operation, as soon as the actual specimen distance is identified.

Another autofocusing possibility is obtained when two or more spot beams from selected regions on the micromirror array are generated, these spot beams being directed through an objective of the optical instrument onto the specimen, on which they generate a spot pattern as an autofocus pattern, and autofocusing being performed by shifting the objective in the focusing direction, i.e. along the optical axis of the objective. A particularly simple and advantageous embodiment of this method consists in generating two or more parallel spot beams, and shifting the objective in the focusing direction until the spots of the spot pattern generated on the specimen merge with one another into one spot. The correct position of the objective has then been found.

For example, two parallel spot beams are directed, usefully parallel to the optical axis of the objective, onto the objective, so that the two beams intersect one another in the specimen-side focal plane of the objective. If the specimen is located outside that focal plane, two spots rather than one spot are produced, and are detected as such by the autofocus analysis unit. The objective is then shifted in the focusing direction, i.e. in this case in the direction of its optical axis, until the specimen is located in the focal plane and therefore only one spot is now detected by the autofocus analysis unit. This second autofocusing method can in certain cases be carried out faster and more easily than the first method referred to above. This second method is of course also applicable to other arrangements, i.e. for example non-parallel spot beams and/or spot beams that proceed asymmetrically with respect to the optical axis of the objective; in such cases, however, the correct position of the objective usually cannot be ascertained immediately by the autofocus analysis unit, but instead some intermediate calculations and resulting corrections must be performed in order to determine the correct spacing between the objective and specimen, which spacing must correspond to the focal length of the objective.

When an objective of variable focal length (variable objective) is used, it is again possible, for autofocusing, to adapt the focal length of the objective rather than modifying the spacing of the objective from the specimen. Once again, the two types of focusing can be combined, for example when the specimen lies outside the focal-length range of the variable objective.

With the second autofocusing method just explained it is once again possible to quickly detect the direction of the focusing that must be performed, once again by observing whether the spots that have been generated move toward or away from one another when the objective is shifted or the focal length of the objective is adapted. Reference is made analogously, for this purpose, to the explanations given in connection with the first autofocusing method.

For detection and analysis of the time-related and spatial change in the autofocus pattern, an imaging unit that images the pattern onto a sensor/detector element, in particular a CCD array, by preference with a large depth of field and a small numerical aperture, is located next to, or arranged downstream behind, the main objective of the optical instrument, such as a microscope. With a downstream analysis unit, the signal delivered by these detector elements can be analyzed in terms of its structure, and by way of an algorithm a determination can then be made as to when—e.g. at what angle setting of the micromirrors—the pattern corresponds to a correct focus position. In the first case of the spot pattern being considered, what is detected is, for example, when an intersection spot of minimum extent, maximum intensity, and maximally steep edges in profile is generated. When this value is achieved, an actuating unit on the main objective is used to shift the objective, as a whole or also only in subcomponents, for autofocusing.

The principal features of these focusing methods that have been described are: The existing illumination beam path of the optical instrument can be used for autofocusing, so that an autofocusing or projection optical system, as in the existing art, need not be separately made available. In one case, an angle measurement is performed on the micromirrors generating the spot beams while the main objective of the optical instrument is stationary. Once the correct angle, and therefore a specimen distance, has been determined, only then is the main objective repositioned or adjusted as to its focal length;

in the other case, the main objective can be immediately shifted or adjusted as to its focal length until the correct distance from specimen to objective has been found.

In a further variant embodiment, when visible or colored autofocus patterns are used the user can be given the capability, by way of an eye-control or eye-tracking system, of placing the focus measurement point at any desired location in the object field. For this, an eye-tracking measurement system is electronically interconnected with the micromirror array. The user's eye movement then controls the location of the autofocus measurement pattern in the object field. A voice control system or, as the simplest embodiment, a manual control application system are also conceivable as variants thereof.

The autofocusing method according to the present invention is advantageously implemented automatically by means of a computer program (or microprocessor program). This computer program can be provided in a separately provided calculation unit of the autofocus system or in a calculation unit of the optical instrument, or can also be partially or entirely contained in the above-described autofocus analysis unit. After selection of the desired autofocus pattern, the computer program applies control to corresponding regions of the micromirror array in order to generate that pattern on the specimen surface. The analysis of the pattern in terms of extent, intensity, and/or edge slope can be a component of the computer program. An automatic modification of the focus position is performed depending on the result of this analysis. With the above-described first method for autofocusing by means of spot beams, the computer program controls the tilt angle of the respective micromirrors until a single spot is detectable on the specimen surface. A specific specimen distance is associated with the corresponding tilt angles of the micromirrors. A corresponding autofocusing operation can thus, as already discussed above, be performed by modifying the specimen distance and/or adjusting the focal length. With the above-described second method for autofocusing by means of spot beams, the computer program directly applies control to a position displacement device for displacing the objective in the focusing direction in order to perform autofocusing as a function of the analysis signals of the autofocus analysis unit. When a variable objective is used, the computer program correspondingly applies control to the device for adapting the focal length of the objective.

BRIEF DESCRIPTION OF THE DRAWINGS

The invention and its advantages will be further explained below with reference to exemplifying embodiments that are illustrated by attached drawing, in which.

DETAILED DESCRIPTION OF THE INVENTION

Figure 1:
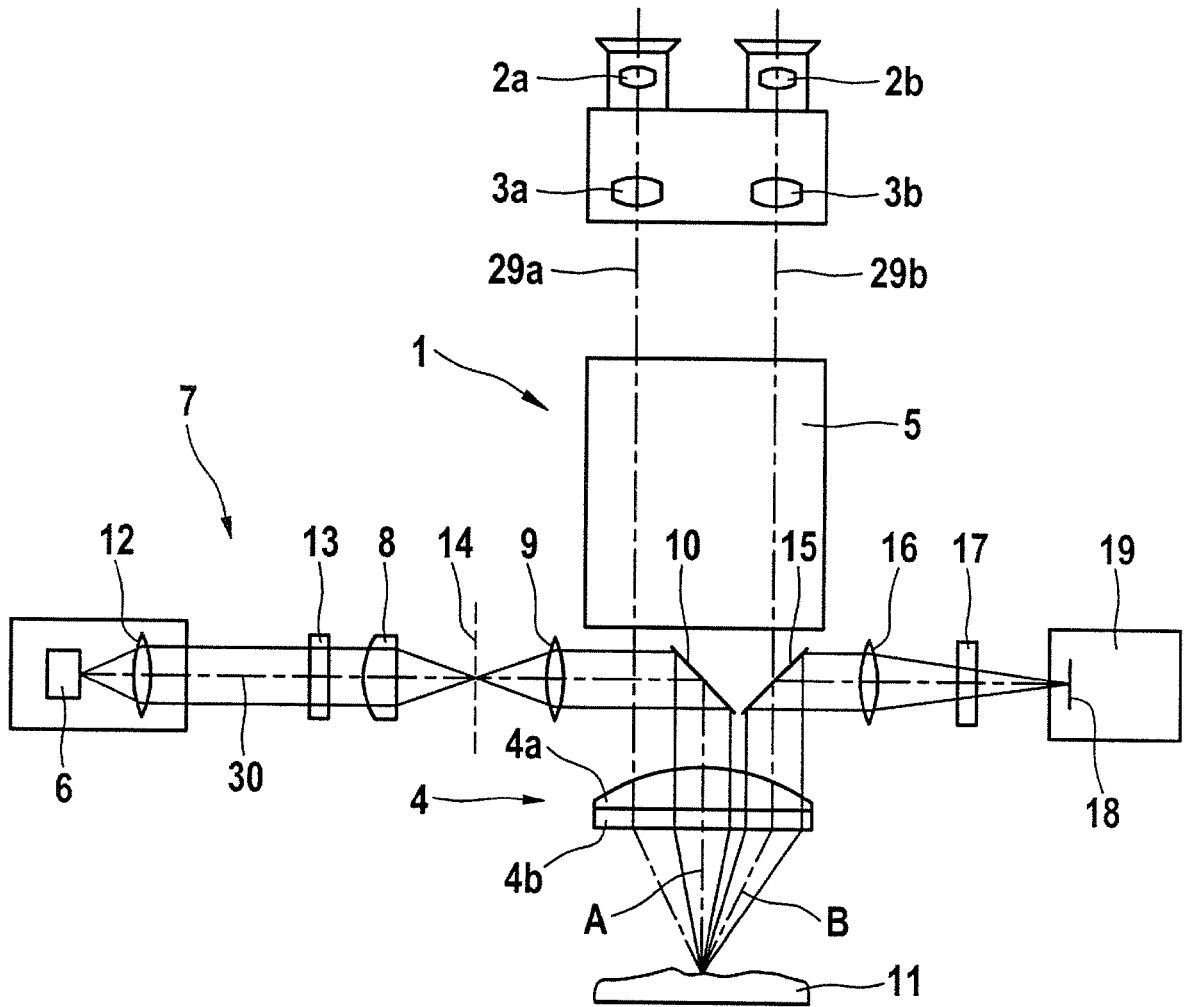
FIG. 1 schematically shows an autofocus system known from the existing art.

FIG. 1 shows an autofocus system for a stereomicroscope according to DE 41 31 737 C2. Reference is made explicitly to this document regarding details. Only the basic principles of the configuration according to FIG. 1 will be explained below. The stereomicroscope, constituting an optical instrument, is labeled 1 in its entirety. It comprises eyepiece lenses 2a, 2b, tube lenses 3a, 3b, a pancratic magnification system 5, and a main objective 4 made up of lenses 4a, 4b. Optical axes 29a and 29b of the two stereoscopic observation beam paths are likewise depicted. The autofocus system encompasses a laser diode 6 and a collimator lens 12. The optical axis of the projection beam path that is generated is labeled 30. The parallel ray bundle passes through a subsequently arranged attenuator 13 that can be switched in for light-sensitive specimens, and through a subsequent cylindrical lens 8 that images the parallel ray bundle into focal plane 14 of cylindrical lens 8 as a thin strip-shaped marking. This image is in turn imaged onto specimen 11 via a further lens 9 as well as a deflection element 10 and main objective 4. In the aforementioned document, a suitable mirror or a prism is used as deflection element 10. Components 6, 12, 13, 8, and 9 constitute the so-called projection optical system 7.

On the receiving side, the laser beam reflected from the specimen surface, after passing through main objective 4, is coupled out of the observation beam path by an outcoupling element or deflection element 15, and imaged via a further projection lens 16 and a filter 17 onto a spatially resolving position detector 18 that is a constituent of autofocus analysis unit 19. Reference is made once again to the aforesaid document with regard to the procedure for autofocusing.

With this known autofocusing method, the angle of irradiation axis A of the irradiation beam path or projection beam path, and the angle of detector beam path axis B, are always constant with reference to the respective deflection elements 10 and 15. To ascertain the correct focus position, the objective is displaced or its intercept distance is varied.

Figure 2:
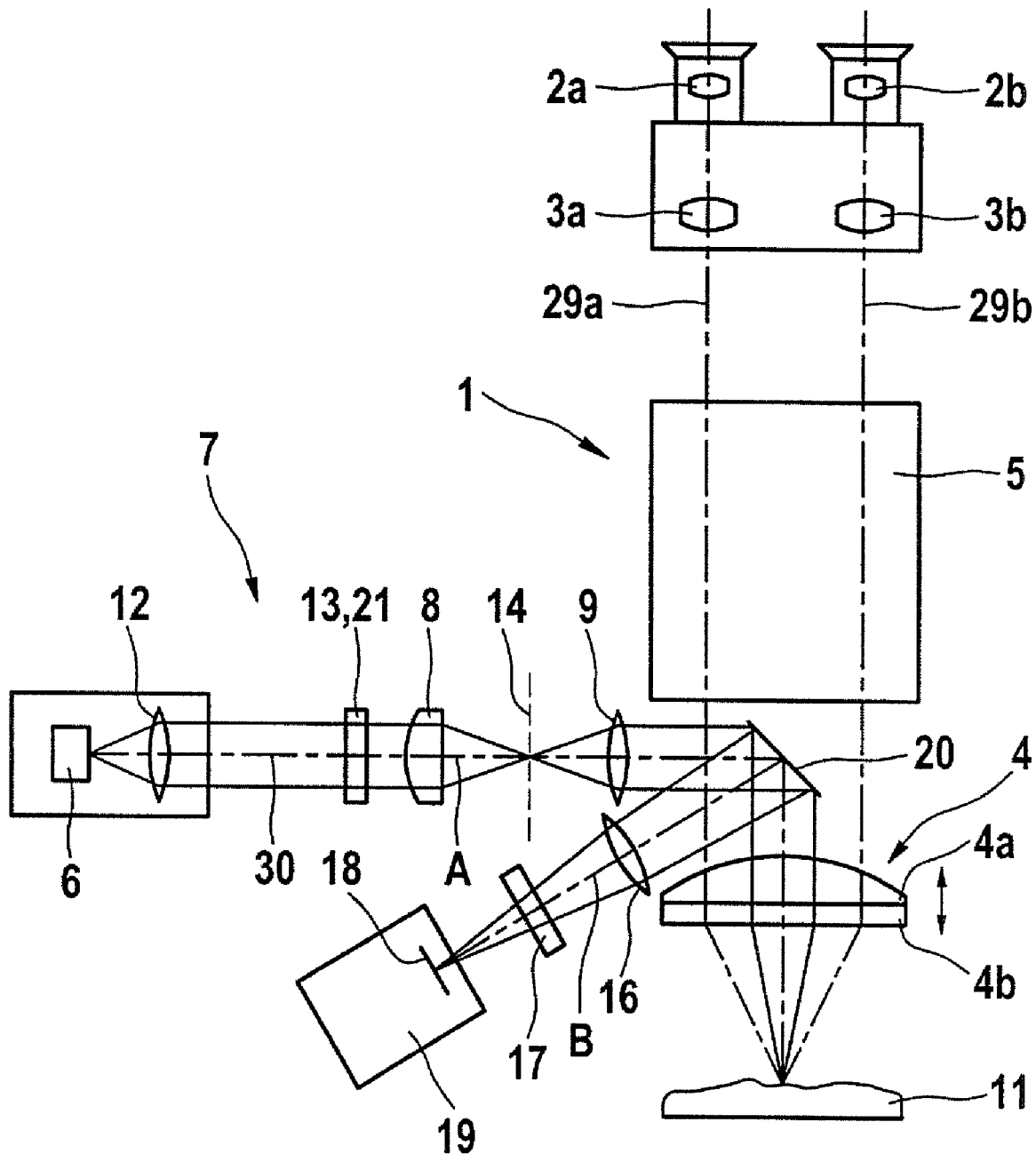
FIG. 2 schematically shows an autofocus system analogous to FIG. 1, modified in accordance with the present invention.

FIG. 2 shows an embodiment of an autofocus system according to the invention, based on a variation of the configuration depicted in FIG. 1. Identical components are labeled with identical reference numbers. Only the differences as compared with the configuration according to FIG. 1 will be explained below. According to the present invention, instead of deflection elements 10 and 15 shown in FIG. 1, a single micromirror array 20 is provided, which makes possible the arrangement depicted in FIG. 2. By appropriate adjustment and tilting of a portion of the micromirrors of micromirror array 20, the irradiation beam path is directed into main objective 4 and from there onto specimen 11, where it generates an autofocus pattern. The radiation reflected from this autofocus pattern is directed, via main objective 4 and micromirror array 20 as well as the previously mentioned components (projection lens 16 and filter 17), onto position detector 18 of an autofocus analysis unit 19. For this purpose, a different portion of the micromirrors of micromirror array 20 are adjusted and tilted in such a way that a further deflection angle, namely the one for axis B of the detector beam path, is realized. The arrangement according to the present invention that is depicted is space-saving and reduces the number of components required.

Be it noted that in the configuration depicted in FIG. 2, instead of the projection optical system 7 made up of components 6, 12, 13, 8, and 9 and serving as irradiation optical system 7, an illumination optical system such as the one usually utilized for the illumination of specimen 11 in stereomicroscopes can be used. The illumination optical system that is in any case present can thus be used for autofocusing, with no need for separate provision of an autofocusing or projection optical system. The components of this illumination optical system 7 correspond substantially to those of projection optical system 7 that is depicted, with the difference that another usual illumination light source 6 can also be used instead of laser diode 6. To generate an autofocus pattern it is then possible to use, for example, instead of attenuator 13, a transmissive display 21 constituting a microdisplay, the intensity distribution of which over the display surface is definable. A transmissive display 21 of this kind allows a wide variety of autofocus pattern geometries to be generated, including those varying over time when this is desired. To generate two spot beams, as provided in the two preferred autofocusing methods already discussed, the brightness of two spots on the display relative to the environment is adjustable. Additionally or alternatively, such spot beams can also be supported or generated by micromirror regions on micromirror array 20. For this, the reader is referred to FIG. 3.

With the arrangement according to FIG. 2, outcoupling of the detector beam path can also occur at a different point, namely, usefully, in the region between components 20 (deflection element) and 12 (collimator lens), in particular between components 12 (collimator lens) and 13 (attenuator) or 21 (microdisplay). Outcoupling can be accomplished by means of a (conventional) deflection mirror, in which context autofocus analysis 19 having the upstream components 17 and 16 would of course need to be arranged accordingly. In this case micromirror array 20 would perform the same deflection with respect to the detector beam path as with respect to the illumination beam path.

Figure 3:
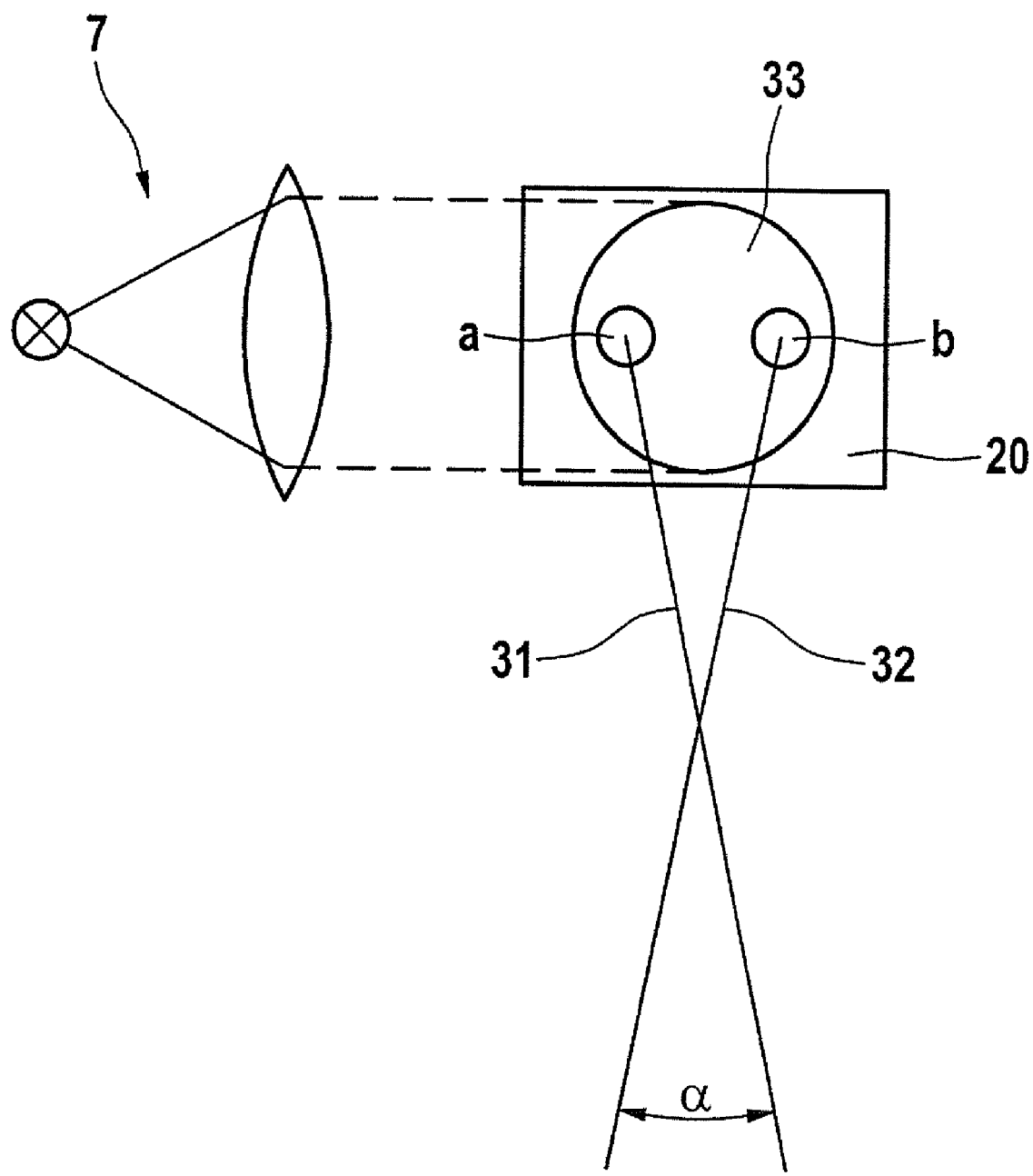
FIG. 3 schematically shows a micromirror array having regions for generating two spot beams.

FIG. 3 schematically shows an illumination optical system 7 constituting an irradiation optical system 7, in a side view, as well as a micromirror array 20, in plan view; two micromirror regions a and b generate, by corresponding tilting of the pertinent micromirrors, two deflectable spot beams 31 and 32. The entirety of the illuminated mirror surface of micromirror array 20 is labeled 33. For simplicity's sake, the components that follow micromirror array in FIG. 2 are not depicted. FIG. 3 illustrates the basic principle of a first preferred autofocusing method. As depicted, the two spot beams 31 and 32 intersect one another. The intersection angle of these spot beams 31 and 32 can be modified by modifying the tilt angle of the micromirrors in the two subregions a and b of micromirror array 20. This basic principle can be used for autofocusing, as explained with reference to the following FIGS. 4 through 6b.

Figure 4:
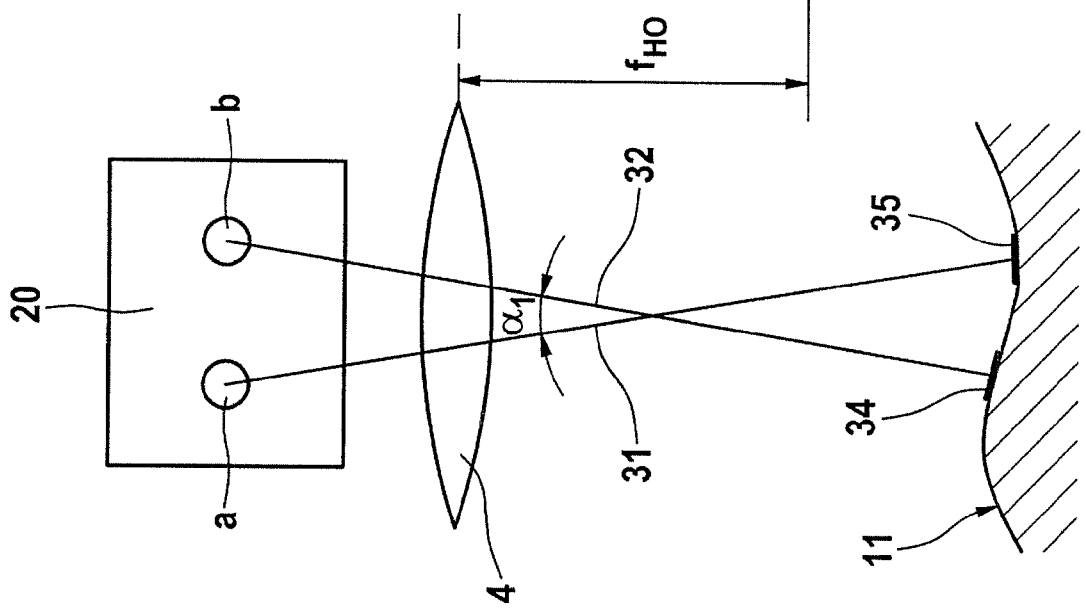
FIG. 4 illustrates a first embodiment of a method according to the present invention for autofocusing by means of two spot beams, FIG. 5 depicting the state suitable for the purpose of setting the focus, and FIGS. 6a and 6b illustrating two possibilities for setting the focus, one with an objective of fixed focal length (FIG. 6a) and one with an objective of variable focal length (FIG. 6b)

FIG. 4 illustrates the adjustment operation, the intersection angle of beams 31 and 32 being labeled $\alpha_1$. The focal length of main objective 4 is labeled $f_{HO}$. Beam paths 31, 32 in FIGS. 4 and 5 do not, of course, in reality travel straight through main objective 4, but are refracted by it. The depiction here is merely schematic, in order to explain the basic principles of autofocusing. As is evident in this exemplifying embodiment, the intersection point of spot beams 31, 32 lies above specimen 11, so that two spots 34 and 35 are visible on the specimen. The intersection angle ($\alpha$, $\alpha_1$, $\alpha_2$) of spot beams 31, 32 depends on the particular tilt angle of the micromirrors in regions a and b. The tilt angle can be defined with reference to a plane to be designated, for example the plane of the base element receiving the micromirrors or a plane proceeding parallel to the principal plane of the objective. The two spots 34 and 35 move away from or toward one another depending on the particular tilt angle of the micromirrors in subregions a and b of micromirror array 20. The focusing direction can thus be ascertained immediately. The spacing of unsharply imaged specimen 11 is in this case greater than focal length $f_{HO}$. If the tilt angle (with respect to a plane perpendicular to the optical axis) of the micromirrors of subregions a and b is decreased, the two spots 34 and 35 on specimen 11 move toward one another until ultimately they merge. This state is depicted in FIG. 5.

Figure 5:
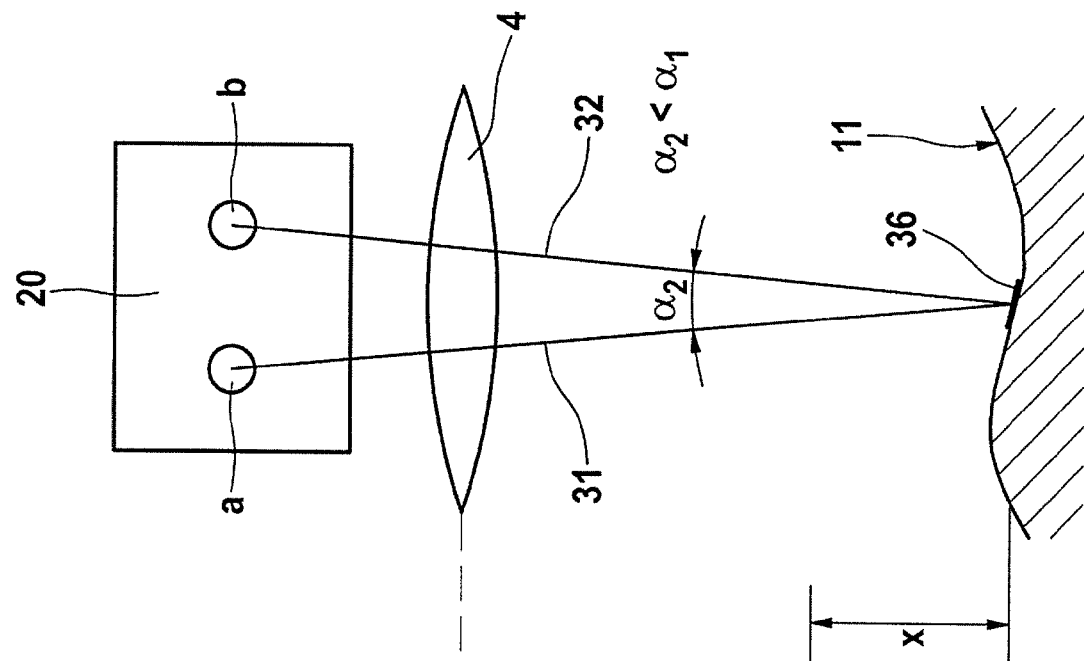

FIG. 5 corresponds to the end point of the measurement operation. The intersection angle of the two spot beams 31 and 32 is labeled $\alpha_2$, where $\alpha_2 < \alpha_1$. The two spots 34 and 35 have now merged into a single spot 46. This can be detected by the spatially resolving position detector 18 of autofocus analysis unit 19, since the single spot 36 exhibits minimum extent, maximum intensity, and steep edges in profile. Based on angle $\alpha_2$ that results from the respective tilt angles of the micromirrors in subregions a and b of micromirror array and on the known refraction properties of objective 4, and on the known spacing between subregions a and b, it is possible to indicate, by triangulation, a distance from micromirror regions a, b, or from objective 4, to specimen 11; the refraction of spot beams 31, 32 by objective 4 must also be considered here. As depicted with reference to the example of FIG. 5, the distance to the main objective is $f_{HO}+x$.

Figure 6B:
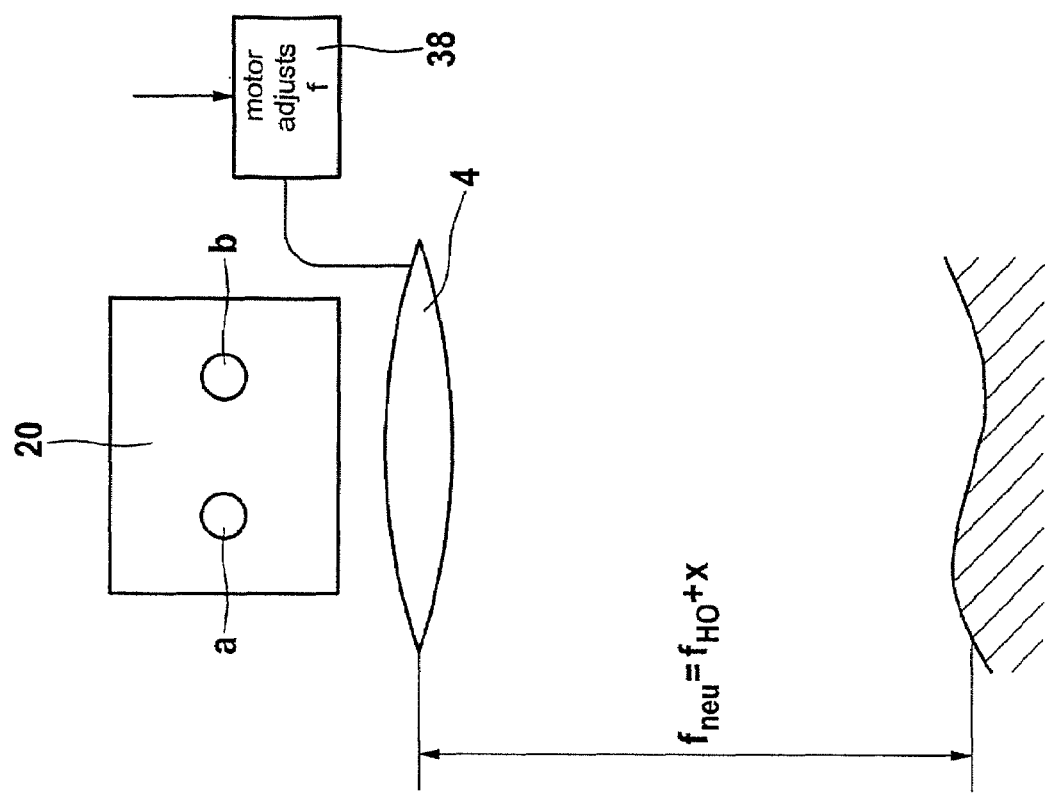
Figure 6A:
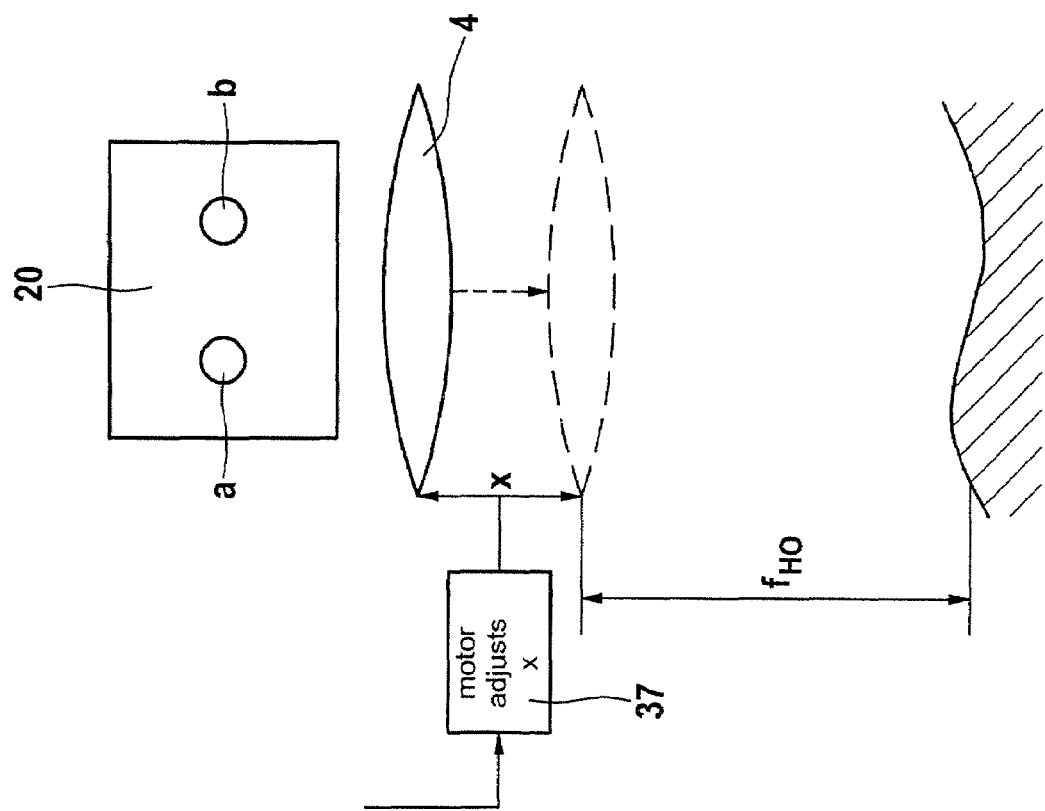

FIGS. 6a and 6b present two possibilities for focusing; with a main objective of fixed focal length (FIG. 6a), adjustment is accomplished in such a way that by means of a motor drive system 37, main objective 4 is shifted a distance x toward specimen 11. Specimen 11 is then located at the focal point of main objective 4.

In the context of an objective of variable focal length (variable objective) as shown in FIG. 6b, instead of a shift of main objective 4 the focal length can be readjusted, such that $f_{neu} = f_{HO}+x$. Once again, a motor 38 can displace the corresponding components of main objective 4 for this purpose.

A combination of the adjustment mechanisms according to FIGS. 6a and 6b can of course be implemented, for example if the specimen distance lies outside the possible focal length range of the variable objective.

FIGS. 4 through 6b have explained graphically that the embodiment according to the present invention of the autofocusing system can be executed in completely automatic fashion. The focusing adjustment (FIGS. 6a and 6b) can already be accomplished on the basis of the ascertained angular position of the micromirrors in regions a and b of the micromirror array (cf. FIG. 5), with no need for the specimen distance to be explicitly determined with the aid of triangulation. The correlation of the aforesaid tilt angle (and therefore of angle $\alpha$) with the specimen distance is unique. The corresponding calculation methods are known from triangulation and optics, and will therefore not be set forth in detail here.

Figure 8:
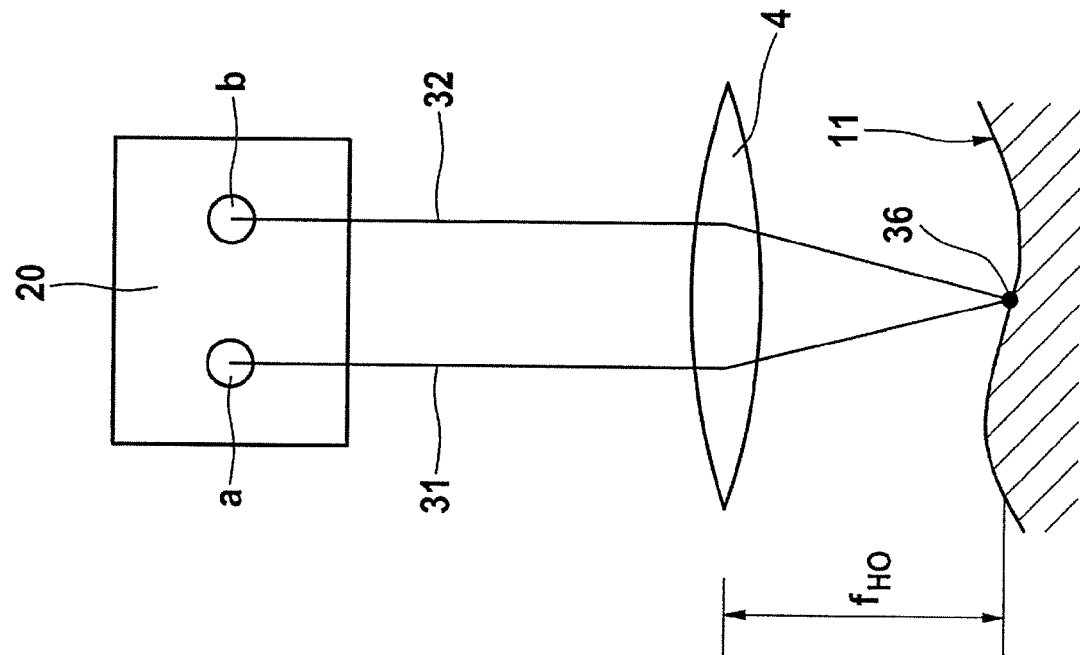
Figure 7:
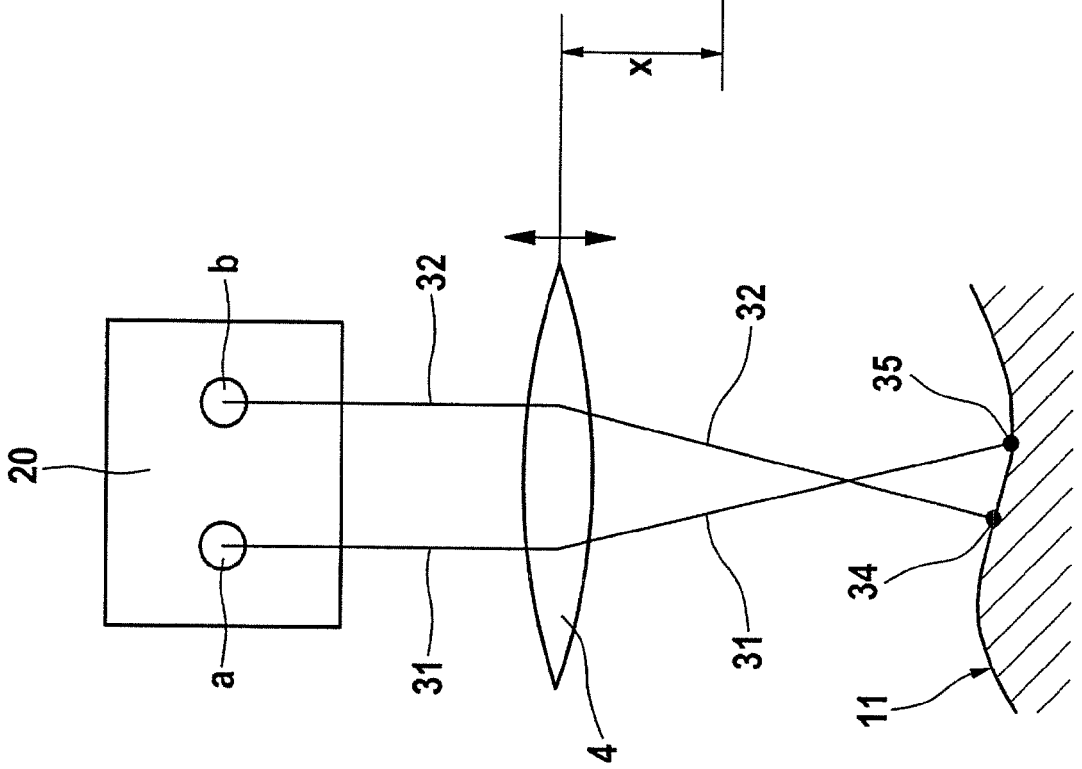
FIG. 7 illustrates a second embodiment of a method according to the present invention for autofocusing by means of two spot beams, FIG. 8 showing the completion of autofocusing after displacement of the objective from a position depicted in FIG. 7 into the final position depicted in FIG. 8, and FIGS. 9A and 9B schematically depicting a micromirror array in plan view (FIG. 9A), and an exemplifying arrangement of micromirrors, in one dimension, in a side view (FIG. 9B).

FIGS. 7 and 8 illustrate a further possible method for autofocusing, in which once again two spot beams 31, 32 are generated by two regions a, b of a micromirror array 20. The two spot beams 31, 32 initially proceed parallel to one another, a track of spot beams 31 and 32 that is parallel and symmetrical with respect to the optical axis of main objective 4 being assumed in FIG. 7 for the sake of better comprehension. It should be noted, as already remarked elsewhere, that the two spot beams 31 and 32 do not necessarily need to be generated only by micromirror array 20, but that a microdisplay can alternatively or additionally also be used for this purpose, the microdisplay being inserted into the illumination beam path and its intensity distribution over the display surface being correspondingly defined (cf. the statements made in conjunction with FIG. 2).

The two spot beams 31, 32 are directed through objective 4 (e.g. main objective 4 of a stereomicroscope 1) onto a specimen 11, on the surface of which they generate a spot pattern constituting an autofocus pattern; the spot pattern is made up here of the two spots 34 and 35. As is evident from FIG. 7, two spots 34 and 35 are generated because specimen 11 is located below the object-side focal plane of main objective 4. In this embodiment objective 4 is displaceable, by means of a positioning device, in the direction of the optical axis or in the focusing direction (indicated by the double arrow in FIG. 7).

For autofocusing, objective 4 is now displaced in the focusing direction. A displacement away from specimen 11 would increase the spacing of spots 34 and 35, so that the autofocus analysis unit would immediately reverse the autofocusing direction. A displacement of objective 4 toward specimen 11 causes spots 34 and 35 to approach one another until they merge into one spot 36, as depicted in FIG. 8. The optimum focus position is set by displacing objective 4 a distance x toward specimen 11.

Alternatively, when a variable objective is used as main objective 4, the focal length could also be correspondingly readjusted (focal length increased by an amount equal to x). Lastly, a displacement of the variable objective can also additionally be performed, in particular when the distance from objective 4 to specimen 11 is outside the possible focal length range of the variable objective.

Figure 9A:
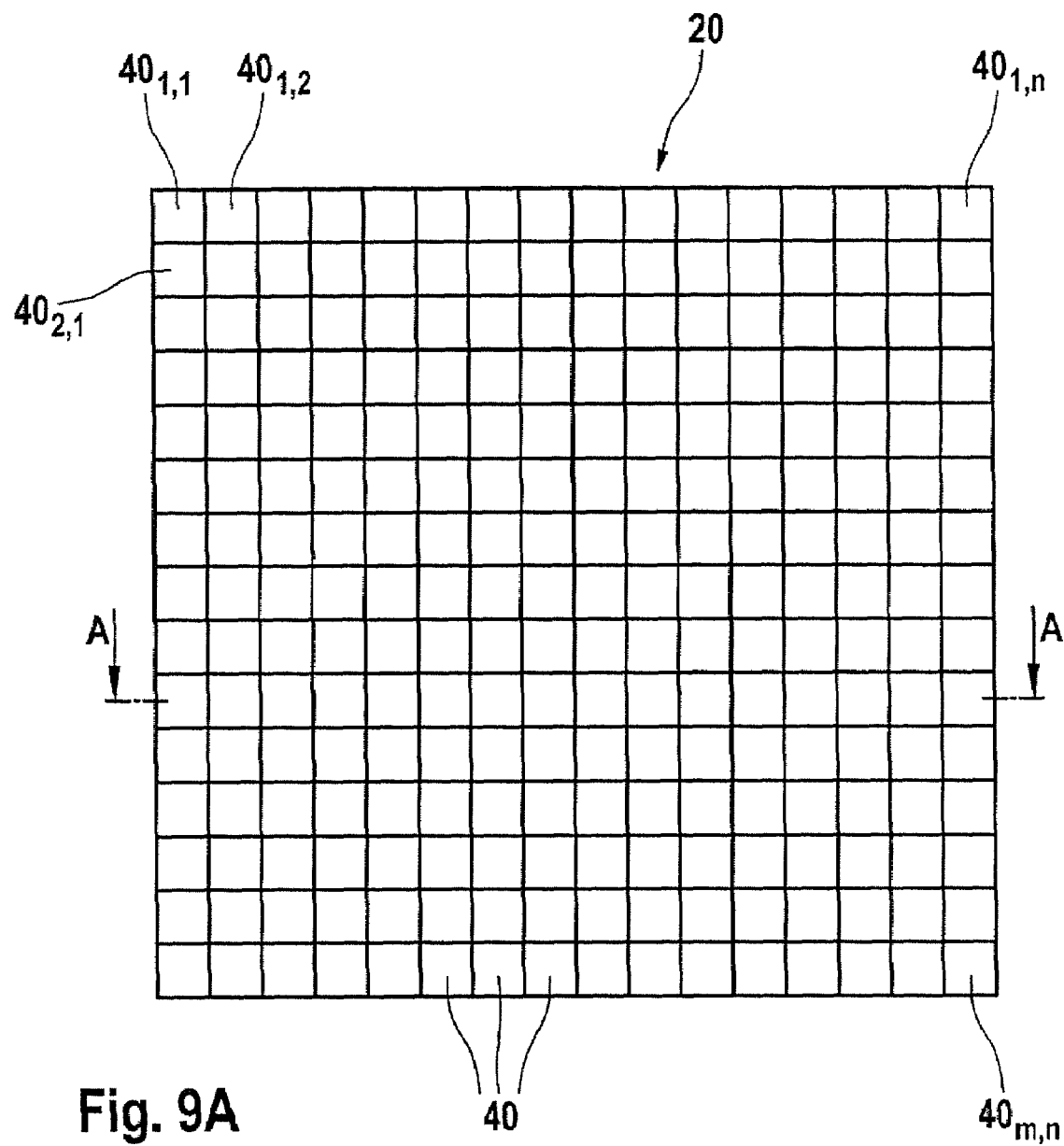
Figure 9B:
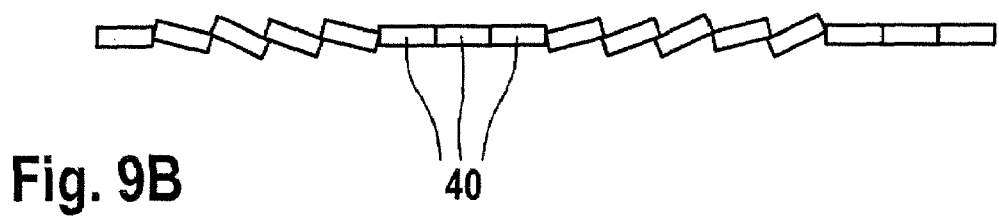

The reader is referred to FIGS. 9A and 9B regarding the configuration of a micromirror array 20. FIG. 9A shows a micromirror array 20 of this kind, having a plurality of micromirrors 40 arranged in a matrix, in a plan view. Micromirrors $40_{1,1}, 40_{1,2}, \ldots, 40_{1,n}$ are arranged in a first row. Micromirrors $40_{2,1}, \ldots, 40_{2,n}$ are arranged in the second row, and so forth until micromirrors $40_{2,1}, 40_{m,2}, \ldots, 40_{m,n}$ are arranged in the last row. Each of these micromirrors 40 can be controlled and adjusted as to its spatial direction, individually or in suitable combination with other micromirrors 40. FIG. 9B shows a section along line A-A of FIG. 9A. FIG. 9B illustrates the spatial orientation of micromirrors 40, a spherical alignment of micromirrors 40 being depicted here by way of example. This kind of spherical alignment in a region a, b of micromirror array 20 is suitable, for example, for generating a spot-shaped or circular beam 31, 32 (cf. FIG. 3). The procedure for applying control to micromirrors 40 of a micromirror array 20 will not be further explained here, since micromirror arrays are known in principle from the existing art.

The invention has the advantage that a separate autofocus module with a special illumination system is not needed, but instead the existing microscope illumination system can be used. The system is furthermore capable of immediately detecting the directional correction when ascertaining the focus position. Further possibilities for embodiments, and further advantages, have already been described above in the description. These can readily be transferred by one skilled in the art to the present exemplifying embodiments in accordance with the appended Figures. Merely for the sake of completeness, be it noted that the invention can be realized even if the micromirror array is located outside or next to main objective 4 of stereomicroscope. A configuration suitable for this is known, for example, from U.S. Pat. No. 5,748, 367. Reference is thus explicitly made to this document for that purpose.

PARTS LIST

| | |
|---|---|
| 1 | Optical instrument, stereomicroscope |
| 2a, 2b | Eyepiece lenses |
| 3a, 3b | Tube lenses |
| 4 | Objective, main objective |
| 4a, 4b | Lenses of main objective |
| 5 | Magnification system |
| 6 | Laser diode, light source |
| 7 | Irradiation optical system, projection optical system, illumination optical system |
| 8 | Cylindrical lens |
| 9 | Lens |
| 10 | Deflection element |
| 11 | Specimen |
| 12 | Collimator lens |
| 13 | Attenuator |
| 14 | Focal plane |
| 15 | Outcoupling element, deflection element |
| 16 | Projection lens |
| 17 | Filter |
| 18 | Position detector |
| 19 | Autofocus analysis unit |
| 20 | Micromirror array as deflection element |
| 21 | Microdisplay |
| 29a, 29b | Optical axes |
| 30 | Optical axis |
| 31 | Spot beam |
| 32 | Spot beam |
| 33 | Illuminated mirror surface |
| 34 | Spot on specimen |
| 35 | Spot on specimen |
| 36 | Spot on specimen |
| 37 | Motor drive system |
| 38 | Motor drive system |
| 40 | Micromirrors |
| a | Region of micromirror array |
| b | Region of micromirror array |
| A | Irradiation beam path axis |
| B | Detector beam path axis |
| $\alpha, \alpha_1, \alpha_2$ | Intersection angle of spot beams 31, 32 |
| $f_{HO}$ | Focal length of main objective |

What is claimed is:

1. An optical instrument that images a specimen, the optical instrument comprising:
   an illumination optical system having an associated illumination beam path, the illumination optical system being operable to illuminate the specimen while the specimen is imaged by the optical instrument; and
   an autofocus system including an irradiation optical system generating an autofocus pattern conveyed onto the specimen along an irradiation beam path, an autofocus analysis unit receiving radiation of the irradiation beam path after reflection by the specimen, the specimen-reflected radiation being conveyed to the autofocus analysis unit along a detector beam path differing from the irradiation beam path, and a micromirror array having individually controllable and adjustable micromirrors, wherein the micromirror array acts as a deflection element in both the irradiation beam path and the detector beam path;
   wherein the irradiation beam path is constituted by at least a portion of the illumination beam path.

2. The optical instrument according to claim 1, wherein the micromirrors of the micromirror array are adjusted to generate the autofocus pattern from the illumination beam path.

3. The optical instrument according to claim 1, wherein the autofocus system includes a microdisplay in the illumination beam path to generate the autofocus pattern.

4. A method for autofocusing an optical instrument that images a specimen, the method comprising the steps of:

generating an autofocus pattern conveyed onto the specimen along an irradiation beam path, wherein the irradiation beam path is deflected by a micromirror array having individually controllable and adjustable micromirrors;

detecting and analyzing radiation of the irradiation beam path after reflection by the specimen, the specimen-reflected radiation being conveyed to an autofocus analysis unit along a detector beam path, wherein the detector beam path is deflected by the micromirror array; and illuminating the specimen along an illumination beam path to enable the optical instrument to image the specimen;

wherein a single optical system is used to generate the autofocus pattern on the specimen and also to illuminate the specimen for imaging by the optical instrument.

5. The method according to claim 4, wherein the specimen-reflected radiation of the autofocus pattern is analyzed in terms of extent and/or intensity and/or edge slope by the autofocus analysis unit.

6. The method according to claim 4, wherein a plurality of spot beams are generated by selected regions of the micromirror array, the plurality of spot beams generating a spot pattern on the specimen as the autofocus pattern, and the spots of the spot pattern on the specimen are made to approach and finally to merge by angle adjustment of the micromirrors in the respective selected regions of the micromirror array, the angular position of the micromirrors or of the spot beams with respect to one another upon merging of the spots furnishing an indication of a specimen distance.

7. The method according to claim 6, wherein a specimen distance is determined from the angular position of the micromirrors or of the spot beams with respect to one another upon merging of the spots.

8. The method according to claim 6, wherein the optical instrument has an objective of fixed focal length, and the spacing of the objective from the specimen is modified for autofocusing depending on the angular position of the micromirrors or the spot beams with respect to one another upon merging of the spots.

9. The method according to claim 7, wherein the optical instrument has an objective of fixed focal length, and the spacing of the objective from the specimen is modified for autofocusing depending on the determined specimen distance.

10. The method according to claims 6, wherein the optical instrument has an objective of variable focal length, and the focal length of the objective is modified for autofocusing depending on the angular position of the micromirrors or the spot beams with respect to one another upon merging of the spots.

11. The method according to claims 7, wherein the optical instrument has an objective of variable focal length, and the focal length of the objective is modified for autofocusing depending on the determined specimen distance.

12. The method according to claim 4, wherein a plurality of spot beams are generated by selected regions of the micromirror array, the plurality of spot beams being directed via an objective of the optical instrument onto the specimen to generate a spot pattern as the autofocus pattern, and autofocusing is performed by displacing the objective in a focusing direction and/or by adapting the variable focal length of the objective.

13. The method according to claim 12, wherein parallel spot beams are generated; and the objective is shifted in the focusing direction, or a variable focal length of the objective is adapted, until the spots of the spot pattern on the specimen merge.

14. An autofocus system for an optical instrument that images a specimen, the autofocus system comprising:

an irradiation optical system generating an autofocus pattern conveyed onto the specimen along an irradiation beam path;

an autofocus analysis unit receiving radiation of the irradiation beam path after reflection by the specimen, the specimen-reflected radiation being conveyed to the autofocus analysis unit along a detector beam path differing from the irradiation beam path; and a micromirror array having individually controllable and adjustable micromirrors, wherein the micromirror array acts as a deflection element in both the irradiation beam path and the detector beam path, wherein a first portion of the micromirrors in the micromirror array are adjusted to deflect the irradiation beam path to generate the autofocus pattern on the specimen, and a second portion of the micromirrors in the micromirror array different from the first portion are adjusted to deflect the detector beam path to the autofocus analysis unit.

15. The optical instrument according to claim 1, wherein the illumination optical system is used as the irradiation optical system.

* * * * *